Sept. 21, 1971  R. R. LAESSIG ET AL  3,606,866
CONTROLLED OXIDATION HEAT SOURCE
Filed May 1, 1969
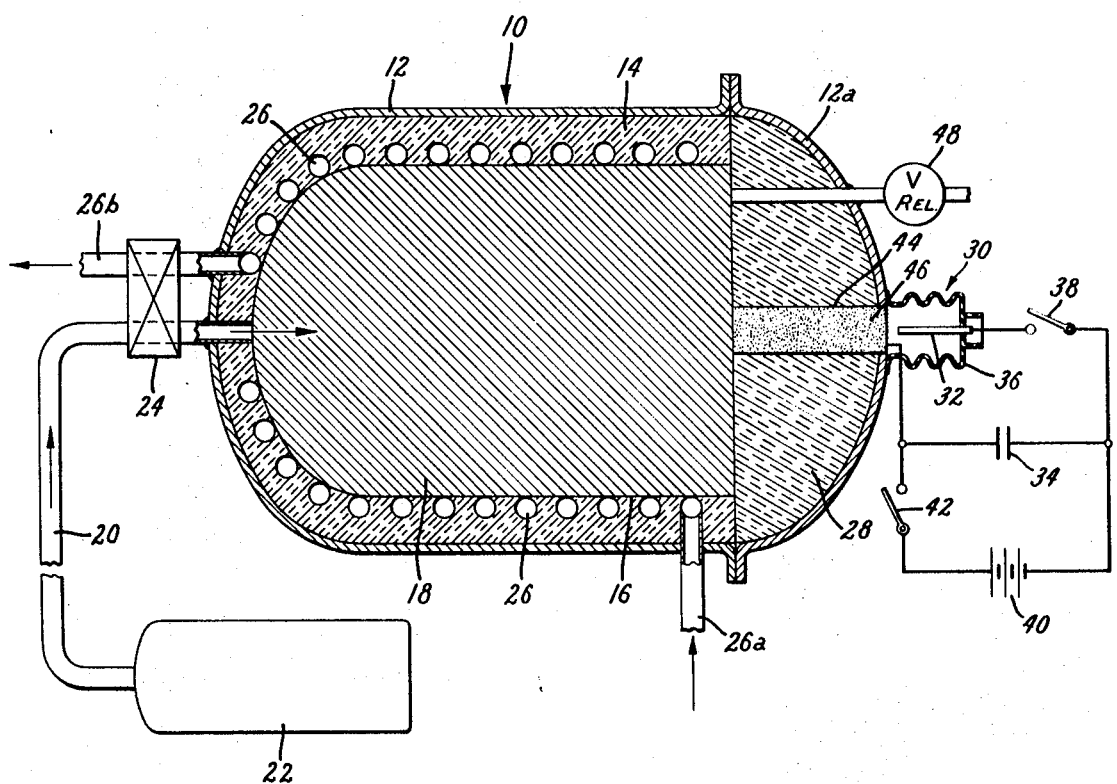
INVENTORS:
RUDOLF R. LAESSIG,
JOHN J. MALEY,
BY
ATTORNEY

United States Patent Office

3,606,866
Patented Sept. 21, 1971

3,606,866
CONTROLLED OXIDATION HEAT SOURCE
Rudolf R. Laessig, Sumneytown, and John J. Maley, Schwenksville, Pa., assignors to General Electric Company
Filed May 1, 1969, Ser. No. 820,871
Int. Cl. F22b *1/00;* F23b *7/00*
U.S. Cl. 122—4                                11 Claims

ABSTRACT OF THE DISCLOSURE

Apparatus for generating heat by oxidation of a metal. The apparatus is comprised of a quantity of oxidizable metal located within a container, a supply of oxygen controllably ducted to the metal, means for initiating the oxidation of the metal and a heat exchanger for conducting the heat generated by the oxidation of the metal to the area to be heated.

BACKGROUND OF THE INVENTION

The subject invention generally relates to the field of heat generation, and, in particular, to a compact, portable self-contained heat generating apparatus.

The need for a compact, reliable self-contained heat source suitable for heating a small shelter or human body has become increasingly important in recent years primarily due to man's widening interest in exploring and working in environments where it is necessary to provide heat to the human body to allow it to function properly. These environments include outer space, the arctic and antarctic regions, and, in particular, underwater. Such heat sources are also useful in more conventional environments where, for example, the heat source could be used as a primary or auxiliary heater for an automobile or as a pollution-free energy source for a suitable power plant such as a steam or other fluid turbine motor. A number of heat sources have been proposed generally involving the use of a combustible fuel such as coal, liquid or gaseous hydrocarbons or other combustible gases or involving an exothermic chemical reaction. However, each of the prior art heat sources possess one or more disadvantages in that it is difficult to control the heat generation rate, the apparatus, the reactants or reaction products are dangerously explosive or caustic, the apparatus is complicated, presents a sizeable weight penalty or cannot provide the amount of heat necessary for many applications.

SUMMARY OF THE INVENTION

Thus, it is an object of the subject invention to provide a compact, self-contained heat source having a heating rate that is easily and simply controlled.

Another object of the subject invention is to provide a compact heat source that is safe to use in substantially any environment.

The subject invention fulfills the above-stated objects by providing a heat source utilizing the controlled oxidation of metals to generate heat. Located within a container is a quantity of an oxidizable metal, such as iron or zirconium. A supply of oxygen is provided along with means for ducting and controlling the flow of oxygen to the oxidizable metal. Suitable means are provided for initiating the oxidation of the metal. Means for transmitting heat generated by the oxidation reaction to the area to be heated, such as a heat exchanger located adjacent the oxidizable metal, is also provided.

The subject matter which is regarded as the present invention is particularly pointed out and distinctly claimed in the concluding portion of this specification.

BRIEF DESCRIPTION OF THE DRAWING

The present invention, however, together with further objects and advantages thereof, may best be understood by reference to the following description taken in connection with the accompanying drawing which is a side view of a preferred embodiment of the subject invention with a portion of the apparatus in section and a portion schematically represented.

DESCRIPTION OF THE PREFERRED EMBODIMENT

In the figure, the preferred embodiment of a heat source 10 in accordance with the subject invention is shown. Heat source 10 is basically comprised of an outer enclosure 12, a layer of low temperature thermal insulation 14 adjacent a portion of the inner surface of enclosure 12, an inner container 16 adjacent insulation 14 and a supply of oxidizable metal 18, preferably in a form of powder, wool or sponge having a large surface area, i.e. oxidizable metal 18 is in a porous, solid form. A pressurized source 22 of a fluid containing oxygen is communicated to oxidizable metal 18 by a duct 20, and means 24 for controlling the flow of the fluid to metal 18 is provided within duct 20. The fluid containing oxygen is hereinafter referred to as oxygen. Any suitable control means may be used such as the thermal control valve 24, as shown in the figure, which is responsive to a particular temperature sensed.

Located adjacent oxidizable metal 18 is a heat exchanger 26 which is conveniently shown as a pipe coiled around container 16 having an input portion 26a and an output portion 26b which extends to the area to be heated (not shown). A heat exchanging fluid, such as water, is pumped through heat exchanger 26 to absorb heat generated by the oxidation of metal 18 and transmit the heat to the area to be heated. Thermal control valve 24 conveniently may be connected to the heat exchanger output 26b so that the temperature of tte heat exchange fluid output controls the flow of oxygen.

In the right hand end portion 12a of enclosure 12, as shown in the figure, a layer of high temperature thermal insulation 28 is located between the interior surface of enclosure portion 12a and container 16. At this enclosure portion 12a, a means 30 is positioned for initiating oxidation of oxidizable metal 18. As an example, initiation means 30 is shown in the figure as a spark discharge device comprised of electrode 32 within a casing 36 which is connected in series to a capacitor 32 which is in turn connected to initiator material 46. A switch 38 in this circuit controls the spark discharge. Connected in parallel to capacitor 34 is a battery 40 and a switch 42 for controlling the charging of capacitor 34. An ignition tube 44 containing the readily oxidizable initiator material 46 is located within high temperature insulation layer 28 and extends from an area adjacent electrode 32 to the area containing oxidizable metal 18. This positioning of ignition tube 44 permits the spark discharge from electrode 32 to initiate oxidation of initiator material 46 which in turn causes oxidation of metal 18.

As shown in the drawing, in the preferred embodiment of the subject invention the oxidation reaction takes place in inner container 16 which is closed. It is therefore desirable for this embodiment to include a pressure relief valve 48 extending through inner container 16 as a safety device. Valve 48 could conveniently be set at about 50 p.s.i.a. to prevent inner container 16 from exploding due to an inadvertent oversupply of pressurized oxygen from oxygen source 22.

For operation, oxygen is initially admitted to the region containing the oxidizable metal. The oxidation reaction is initiated by closing switch 38 to discharge capacitor 34 and cause a spark to be formed at electrode 32. This spark initiates oxidation of initiator material 46 and the resulting oxidation front propagates rapidly through material 46, only oxidizing a small portion of the material, and through oxidizable metal 18 toward the oxygen supply coming from duct 20. The oxidation front is then stabilized at the unconsumed metal interface closest to oxygen supply duct 20 and propagates slowly into the unconsumed metal toward the end near ignition tube 44. As metal 18 reacts with the oxygen, heat is generated. The heat exchange fluid flowing through heat exchanger 26 absorbs this heat and transmits it to the area to be heated. Thermal valve 24 senses the temperature of the heat exchange fluid flowing from heat exchanger 26 and adjusts the flow of oxygen to metal 18 accordingly so as to maintain a desired heat output from the heat source. In this manner the rate of heat generation, which is determined by the rate at which metal is being oxidized, is controlled simply by controlling the flow rate of the oxygen. As heat is generated, the metal is consumed (i.e. oxidized) roughly along a plane perpendicular to the axis of the cylinder until all the metal is consumed.

Heat source 10 can also be controlled by regulating the oxygen flow in accordance with the temperature of the area or body to be heated in a manner well known in the art rather than by the temperature of the heat exchange fluid. Alternatively, the heat output can be controlled by regulating the flow of heat exchange fluid through heat exchanger 26.

The apparatus of the subject invention can be stopped and restarted as many times as necessary. The heat generation can be stopped by merely cutting off the oxygen flow to the metal and restarted by allowing oxygen flow to commence and charging, then discharging capacitor 34 to provide a spark.

Any other suitable means for initiating oxidation may be used. For example, in place of the capacitor, a piezoelectric crystal may be used. An impact to the crystal would cause a current to be generated to provide a spark discharge. Other examples include use of a fuse, electric heater or small explosive detonation to initiate oxidation.

In some applications, particularly where a gaseous discharge is permissible, the oxygen source may have included therein one or more diluent gases. For example, the oxygen source may be a supply of pressurized air. When the oxygen source includes diluent gases, suitable provision must be made for venting the diluent gases from the chamber at which oxidation takes place. As these gases will have been heated by the oxidation reaction, they can conveniently be used as part of the heat exchanging means. These heated gases could be ducted to an area to be heated to provide the desired heating effect. Alternatively heat exchange coils could be placed in the flow path of the heated gases with the fluid flow through the heat exchange coils providing the desired heating effect.

In an embodiment where the diluent gases are substantially inert, the subject invention can be also used to produce inert gases by taking the oxygen gas out of a gas supply. For example, if air were used, the heated diluent gases would almost completely consist of nitrogen. Similarly, if a suitable liquid (for example, liquid $CO_2$) were added to the oxygen entering the container, the subject invention could be used as a device for generating gas or vapor from a liquid by using the heat generated to cause a change in phase.

Also many other heat generation and heat exchange configurations may be used. For example, in place of the heat exchanger tubes a plurality of radiating fins may be attached to container 16 to provide heat transfer by convection and radiation. This configuration would probably be most useful when heat source 10 is used to heat a small enclosure. Also, a plurality of elongated containers enclosing oxidizable metal may be used, with each being connected to a source of oxygen.

Substantially any metal or metallic alloy may be used as an oxidizable reactant. Among the factors that should be considered in choosing a suitable reactant are: the cost, availability, weight considerations, heat of oxidation, controllability of the oxidation reaction, temperature at which oxidation will take place, melting point, characteristics of the oxide formed (particularly in regard to whether the oxide would serve as a barrier to the flow of oxygen), and various safety factors such as whether the metal is highly combustible in air. The following metals are examples of oxidizable reactants that have at least some desirable characteristics for use with the subject invention—iron, aluminum, magnesium, thorium, beryllium, boron, zirconium, titanium, manganese, silicon and chromium. This list is merely exemplary and is not intended to be a complete list of materials that may be used. In particular, iron has been shown to be very desirable due to its low cost, availability, and ease of controlling the reaction, and zirconium is desirable from weight and heat of oxidation considerations.

The subject invention can be conveniently fabricated in a form in which the oxidizable metal is contained within an easily replaceable cartridge which can be simply connected to an oxygen source, a system for pumping heat exchange fluid and an oxidation initiating means. Alternatively, the oxidation initiating means, and, if desired, a supply of oxygen could be included in the replaceable cartridge. As an alternative to supplying the oxygen from a pressurized tank, oxygen could be supplied by a suitable means for generating oxygen such as the chemical oxygen generators which are well known in the art.

The subject invention provides many advantages over prior art devices in that the heat source is compact and light weight, there is no possibility of explosion as the oxidation reaction tends to decrease the pressure within the container even at increased temperatures because the reaction product is a solid, control of the reaction is extremely simple since all admitted oxygen is consumed in the reaction process independent of the rate of admission as long as some metal is left, the reactants do not have to be metered in stoichiometric proportions, in some embodiments there are no fluid exhaust products, metal reactants can be used which are virtually non-combustible in air, the apparatus will operate over a wide range of pressure and heat release rates, the apparatus can easily be started, stopped and restarted, no noise is generated by the apparatus, and the apparatus can be refueled easily by simple attachment of a cartridge.

The above-mentioned advantages make the subject invention particularly adaptable for uses such as heating a space suit or underwater diver's suit or heating small enclosures such as a car, tent or small cabin.

It is obvious that many modifications being made to the subject invention without departing from the true scope thereof. Thus, the scope of the subject invention is to be limited only by the appended claims.

What I desire to secure from Letters Patent of the United States is:

1. A heat generating apparatus comprising:
   (a) a closed container;
   (b) an oxidizable metal in a solid porous form located within said container;
   (c) a fluid source of oxygen;
   (d) means for ducting and controlling the flow of oxygen to said oxidizable metal; and
   (e) means for initiating oxidation of said oxidizable metal.

2. Apparatus as in claim 1 wherein said oxidizable metal is from a group consisting of iron, aluminum, magnesium, thorium, beryllium, boron, zirconium, titanium, manganese, silicon and chromium.

3. Apparatus as in claim 1 wherein said oxidizable metal is iron.

4. Apparatus as in claim 1 wherein said oxidizable metal is zirconium.

5. Apparatus as in claim 1 further including heat exchanging means for transmitting heat generated by the oxidation of said oxidizable metal to an area to be heated.

6. Apparatus as in claim 5 wherein said heat exchanging means includes a pipe at least a portion of which is located adjacent said oxidizable metal and a heat exchange fluid flowing through said pipe.

7. Apparatus as in claim 6 wherein said heat exchange fluid is water.

8. Apparatus as in claim 1 wherein said means for initiating oxidation includes means for providing an electric spark discharge.

9. Apparatus as in claim 8 wherein said means for providing a spark discharge includes a capacitor, an electric power supply for charging said capacitor, and electrode means connected in series with said capacitor.

10. Apparatus as in claim 9 wherein said means for initiating oxidation includes a readily oxidizable initiator material extending from an area adjacent said electrode means to an area adjacent said oxidizable metal.

11. Apparatus as in claim 5 wherein said means for initiating oxidation includes a means for providing an electric spark discharge.

References Cited

UNITED STATES PATENTS

| | | | |
|---|---|---|---|
| 1,349,969 | 8/1920 | Leathers | 60—39.46X |
| 1,419,267 | 6/1922 | Kasley | 60—37 |
| 1,532,930 | 4/1925 | O'Neill | 122—4X |
| 2,997,006 | 8/1961 | Grosse | 110—1 |
| 3,093,960 | 6/1963 | Tyson, Jr. | 60—251X |
| 3,107,485 | 10/1963 | Toulmin, Jr. | 60—251X |

KENNETH W. SPRAGUE, Primary Examiner

U.S. Cl. X.R.

110—1